United States Patent
Ono et al.

(10) Patent No.: US 9,902,131 B2
(45) Date of Patent: Feb. 27, 2018

(54) TRANSPARENT ADHESIVE SHEET

(71) Applicant: Osaka Sealing Printing Co., LTD., Osaka (JP)

(72) Inventors: Shinichi Ono, Osaka (JP); Hidenao Takeuchi, Osaka (JP); Masahiko Yoshida, Osaka (JP); Hidenobu Harima, Osaka (JP); Takayuki Kimura, Osaka (JP)

(73) Assignee: Osaka Sealing Printing Co., LTD., Osaka (JP)

( * ) Notice: Subject to any disclaimer, the term of this patent is extended or adjusted under 35 U.S.C. 154(b) by 0 days.

(21) Appl. No.: 14/906,573

(22) PCT Filed: Jul. 25, 2014

(86) PCT No.: PCT/JP2014/069678
§ 371 (c)(1),
(2) Date: Jan. 21, 2016

(87) PCT Pub. No.: WO2015/012386
PCT Pub. Date: Jan. 29, 2015

(65) Prior Publication Data
US 2016/0159035 A1    Jun. 9, 2016

(30) Foreign Application Priority Data
Jul. 26, 2013    (JP) .................... 2013-155982

(51) Int. Cl.
*B32B 7/06* (2006.01)
*B32B 7/12* (2006.01)
(Continued)

(52) U.S. Cl.
CPC .................. *B32B 7/06* (2013.01); *B32B 7/12* (2013.01); *B41M 5/42* (2013.01); *C09J 7/02* (2013.01);
(Continued)

(58) Field of Classification Search
CPC ................ B41M 5/42; B41M 2205/04; B41M 2205/36; B41M 2205/38; C09J 7/02;
(Continued)

(56) References Cited

U.S. PATENT DOCUMENTS 5,210,066 A    5/1993   Yanagihara
5,380,693 A *  1/1995   Goto .................... B41M 5/3333
                                                          427/152
(Continued)

FOREIGN PATENT DOCUMENTS

EP    2554392 A1    2/2013
JP    01154791      6/1989
(Continued)

OTHER PUBLICATIONS

International Search Report dated Oct. 28, 2014 filed in PCT/JP2014/069678.
(Continued)

*Primary Examiner* — Patricia L. Nordmeyer
(74) *Attorney, Agent, or Firm* — Rankin, Hill & Clark LLP

(57) ABSTRACT

There is provided a transparent adhesive sheet on which printing can be performed during in use and which has high transparency, while including an adhesive layer on the back surface side and a release layer on the front surface side. The transparent adhesive sheet includes: a base material layer formed with a transparent material; an adhesive layer formed on the back surface side of the base material layer and formed with an adhesive agent for bonding to an adherend; a recording layer formed on the front surface side of the base material layer and containing a color developing material that thermally develops color; and a release layer formed on the further front surface side of the recording layer and having release properties to the adhesive agent.

(Continued)

The transparent adhesive sheet is transparent in the state before the recording layer develops color.

13 Claims, 3 Drawing Sheets

(51) Int. Cl.
  *B41M 5/42* (2006.01)
  *C09J 7/02* (2006.01)
(52) U.S. Cl.
  CPC ........... *C09J 7/0217* (2013.01); *C09J 7/0271* (2013.01); *C09J 7/0275* (2013.01); *C09J 7/0296* (2013.01); *B32B 2307/412* (2013.01); *B32B 2307/728* (2013.01); *B32B 2405/00* (2013.01); *B41M 2205/04* (2013.01); *B41M 2205/36* (2013.01); *B41M 2205/38* (2013.01); *C09J 2483/005* (2013.01)
(58) Field of Classification Search
  CPC ......... B32B 7/06; B32B 7/12; B32B 2405/00; B32B 2307/412; B32B 2307/728; Y10T 428/14; Y10T 428/28
  See application file for complete search history.

(56) References Cited

U.S. PATENT DOCUMENTS

| | | | |
|---|---|---|---|
| 5,677,365 A | 10/1997 | Katsuyuki | |
| 5,840,657 A * | 11/1998 | Mehta | G09F 3/10 504/280 |
| 5,888,929 A | 3/1999 | Iida | |
| 6,921,740 B1 | 7/2005 | Takahisa | |
| 2002/0065197 A1* | 5/2002 | Liang | B41M 5/42 503/226 |
| 2012/0208698 A1 | 8/2012 | Akihito | |
| 2013/0053240 A1 | 2/2013 | Uesugi | |
| 2016/0159035 A1 | 6/2016 | Masahiko | |
| 2016/0263926 A1 | 9/2016 | Masahiko | |

FOREIGN PATENT DOCUMENTS

| | | |
|---|---|---|
| JP | 1156062 A2 | 6/1989 |
| JP | 04325287 | 11/1992 |
| JP | 05069665 | 3/1993 |
| JP | 06227124 | 8/1994 |
| JP | 08025807 | 1/1996 |
| JP | 3156406 A2 | 6/1996 |
| JP | 10006652 A2 | 1/1998 |
| JP | 10166730 A2 | 6/1998 |
| JP | 10195394 A2 | 7/1998 |
| JP | 10251591 A2 | 9/1998 |
| JP | 11-099749 | 4/1999 |
| JP | 11165464 A2 | 6/1999 |
| JP | 2000273403 A2 | 10/2000 |
| JP | 2001353964 A2 | 12/2001 |
| JP | 2002362027 A2 | 12/2002 |
| JP | 200540989 | 2/2005 |
| JP | 2008063520 A2 | 3/2008 |
| JP | 2010023252 | 2/2010 |
| WO | 2011027752 A1 | 3/2011 |
| WO | 2011122552 A1 | 10/2011 |
| WO | 2015012386 A1 | 1/2015 |
| WO | 2015072410 A1 | 5/2015 |
| WO | 2015072411 A1 | 5/2015 |

OTHER PUBLICATIONS

Extended European Search Report dated Feb. 23, 2017 issued in the corresponding European Patent Application No. 14829302.0.
Chinese Office Action dated Mar. 22, 2017 for the corresponding Chinese Patent Application No. 201480042012.9.

* cited by examiner

TRANSPARENT ADHESIVE SHEET

TECHNICAL FIELD

The present invention relates to a transparent adhesive sheet having excellent transparency and including an adhesive layer on the back surface side.

BACKGROUND ART

A transparent adhesive sheet is widely used as, for example, a transparent adhesive tape. The transparent adhesive sheet is not only excellent in appearance, but also does not hide an adherend even after attached to the adherend. Therefore, its application is extraordinarily wide.

The transparent adhesive sheet often includes an adhesive layer formed with an adhesive agent on the back surface side. Such a transparent adhesive sheet also includes, on the front surface side, a release layer containing a release agent having release properties to the adhesive agent. The long transparent adhesive sheet configured as described above, which is wound around a core material, is commercially available. In such a wound state, the adhesive agent is in contact with the release layer of its immediately inner layer. This prevents the transparent adhesive sheet from being bonded to the transparent adhesive sheet itself. Therefore, a user can release the adhesive layer which has been temporarily bonded to the release layer, thereby using the transparent adhesive sheet sequentially from the outer circumferential side.

Incidentally, as a release agent to be used in the release layer, a water-repellent or oil-repellent component such as silicone resins and silicone oils is added. These release agents are likely to repel printed ink in general. Therefore, it is difficult to perform printing on the release layer. In order to prevent printing from being performed on the release layer, for example, it is also conceivable to previously perform printing on a layer to become a base material or the like and then forming the release layer or the adhesive layer. However, in this method, a request to perform printing when bonding the transparent adhesive sheet cannot be met.

To address this concern, there is proposed a technology of printing on an adhesive tape by irradiation with laser beams (Patent Literature 1). This literature describes that according to this method, "high-mix small-lot individual printing can be simply manufactured" by irradiation with laser beams (Patent Literature 1, paragraph [0001]). It is noted that as described herein, printing which has been already performed when a transparent adhesive sheet is supplied to a user is referred to as simply "preprinting", and, for example, printing which is performed during in use is referred to as "printing" hereinafter. It is noted that what is printed is not particularly limited. What is printed includes not only letters but also designs, color patterns, pictures, photographs, and the like.

There is also proposed a technology of forming a release layer as a top layer on the front surface side of a thermal color developing paper sheet and forming an adhesive layer as a bottom layer on the back surface side, and thereafter thermally printing on the thermal color developing paper sheet (Patent Literature 2).

CITATION LIST

Patent Literature

PATENT LITERATURE 1: JP-A-2008-63520
PATENT LITERATURE 2: JP-A-2000-273403

SUMMARY OF THE INVENTION

Problems to be Solved by the Invention

In the technology according to Patent Literature 1, laser beams are irradiated on a laminated deep-color ink layer to remove the irradiated portions. By exposing a white or pale color ink layer laminated on the lower layer side of the deep-color ink layer in this manner, printing is performed. Therefore, the deep-color ink layer capable of absorbing laser beams needs to be formed. For this reason, a transparent adhesive sheet having a deep color as a whole can only be manufactured.

In the technology according to Patent Literature 2, transparency is damaged by the thermal layer. Therefore, this technology cannot be applied to a transparent adhesive sheet.

An object of the present invention is to provide a transparent adhesive sheet that can be used as a transparent adhesive tape and on which printing can be performed during in use.

Solution to the Problems

A transparent adhesive sheet according to the present invention includes: a base material layer formed with a transparent material; an adhesive layer formed on a back surface side of the base material layer and formed with an adhesive agent for bonding to an adherend; a recording layer formed on a front surface side of the base material layer and including a color developing material that thermally develops color; and a release layer formed on the further front surface side of the recording layer and having release properties to the adhesive agent. The transparent adhesive sheet is transparent in a state before the recording layer develops color.

According to the above-described configuration, the transparent adhesive sheet includes the recording layer containing a color developing material that thermally develops color. This enables thermal printing during in use. Also, the transparent adhesive sheet includes the base material layer formed with a transparent material and the recording layer that is transparent in a state before it develops color. Therefore, the transparent adhesive sheet can be used as a transparent adhesive tape. It is noted that as described herein, "transparent" includes "colorless transparent" and "colored transparent."

Effects of the Invention

Printing can be performed in a simple method when the transparent adhesive sheet according to the present invention is used. Therefore, the transparent adhesive sheet can be used as a transparent adhesive tape on which printing has been performed. Furthermore, since the transparent adhesive sheet has high transparency, an adherend is not hidden even when the transparent adhesive sheet is bonded to the adherend.

DESCRIPTION OF EMBODIMENTS

First Embodiment

Figure 1:
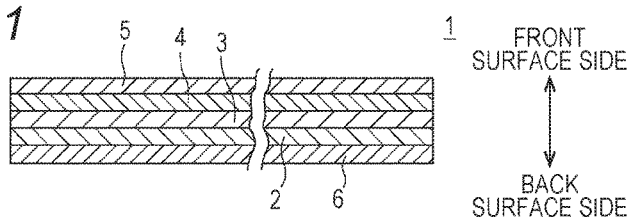
FIG. 1 is a schematic cross-sectional view of a transparent adhesive sheet according to a first embodiment.

Hereinafter, the first embodiment of the present invention will be described with reference to FIGS. 1 to 3. It is noted that in the following description, a front surface side and a back surface side refer to the directions indicated by arrows in the drawing.

FIG. 1 is a schematic cross-sectional view of a transparent adhesive sheet according to the present embodiment. A transparent adhesive sheet 1 includes a base material layer 2 formed with a transparent material, an adhesive layer 6 formed on a back surface side of the base material layer 2 and formed with an adhesive agent for bonding to an adherend, a recording layer 3 formed on a front surface side of the base material layer 2 and containing a color developing material that thermally develops color, and a release layer 5 formed on the further front surface side of the recording layer 3 and having release properties to the adhesive agent. This transparent adhesive sheet 1 further includes an intermediate layer 4 arranged on the front surface side of the recording layer 3 so as to be in contact with the recording layer 3. Furthermore, the transparent adhesive sheet 1 is transparent as a whole in the state before the recording layer 3 develops color. It is noted that as described herein, "transparent" means a state in which, when the transparent adhesive sheet 1 is bonded to an adherend such as a commercial product, the adherent can be visually recognized through the transparent adhesive sheet 1. Therefore, as described herein, "transparent" includes "colorless transparent" and "colored transparent." Specifically, the opacity in accordance with JIS P8138 in the state before the recording layer 3 develops color is preferably not more than 25%. When the opacity falls within the above-described range, the transparent adhesive sheet has high transparency. The opacity is further preferably not more than 20%. The opacity can be measured using, for example, a commercially available reflectometer. It is noted that JIS P8138 is a measurement standard for the opacity of paper. It is noted that when preprinting has been performed on a part of the transparent adhesive sheet 1, the opacity is measured in a part other than the preprinted part.

The transparent adhesive sheet 1 is long, and has a shape generally called a transparent adhesive tape. This long transparent adhesive sheet 1 is wound around a core material 8 as illustrated in FIG. 2 to be supplied to a user. As this core material 8, inexpensive paper or the like is usually used. However, resin or metal, which can prevent deformation, can also be used depending on applications. Also, usually, a cylindrical core material is often used. However, there can be used any core material having a shape that allows the transparent adhesive sheet 1 to be wound around, such as columnar, prismatic, and square tubular. Also, the length of the core material 8 may be the same as the length in the lateral direction of the transparent adhesive tape. However, the length of the core material 8 may be shorter or longer than the length in the lateral direction of the transparent adhesive tape, as long as it allows the transparent adhesive sheet 1 to be wound around.

When the transparent adhesive sheet 1 is wound around, the adhesive agent of the adhesive layer 6 is in contact with the release layer 5, except for a part which is brought into contact with the core material 8. The release layer 5 has release properties to the adhesive agent. Therefore, the transparent adhesive tape is inhibited from adhering by the adhesive agent. A user can sequentially peel off a necessary amount of the transparent adhesive tape from the exterior side of the wound tape toward the core material 8 side. Then, a user can cut away the peeled transparent adhesive tape, and use the cut adhesive tape.

Hereinafter, the configuration of each layer of the transparent adhesive sheet 1 will be described in more detail.
(Base Material Layer 2)

The base material layer 2 is constituted by a transparent material, for example, a transparent resin film. The resin constituting the base material layer 2 is not particularly limited as long as the film has flexibility and high transparency. Examples of such resin include polyolefin resins such as polyethylene and polypropylene, styrene resins such as polystyrene, polyester resins such as polyethylene terephthalate, and carbonate-based resins such as polycarbonate. One of these resins may be used alone, or two or more thereof may be used in combination.

The resin film constituting the base material layer 2 may be an unstretched film or may be a stretched film. The stretched film may be either a uniaxial stretched film or a biaxial stretched film. Also, the base material layer 2 may be either a single-layer film or a multi-layer film.

From the viewpoint of transparency, handling properties, easiness of forming another layer, strength, and the like, the thickness of the base material layer 2 is, for example, 5 to 150 μm, preferably 10 to 100 μm, and further preferably 20 to 70 μm.
(Recording Layer 3)

The recording layer 3 is a layer for thermally develops color, and is disposed for enabling printing. The disposition of the recording layer 3 allows, for example, a printer having a thermal head to be used so that the recording layer 3 develops color. This enables printing of letters or designs at an optional timing.

The recording layer 3 includes a color developing material that thermally develops color. The color developing material is not particularly limited as long as it is a color developing material that can thermally develop color. A color developing dye that can develop color alone may be used. Alternatively, a combination of a transparent or pale color dye (leuco dye) and a developer that enables this dye to thermally develop color may be used. A color developing material including the combination of a leuco dye and a developer, which is used in common thermal recording paper or the like, is readily available and has high versatility.

As the leuco dye, a known dye can be used. Examples of the leuco dye include various leuco dyes based on triphenylmethane phthalide, triallyl methane, fluoran, phenothiazine, thiofluoran, xanthene, indophthalyl, spiropyran, azaphthalide, chromenopyrazole, methine, rhodamine anilinolactam, rhodamine lactam, quinazoline, diazaxanthene, and bislactone. Of these leuco dyes, one may be used alone. However, the use of a combination of two or more leuco dyes allows a recording layer which enables printing with a desired color to be formed.

Of the above-described leuco dyes, a fluoran-based leuco dye and a phthalide-based leuco dye are preferred. Examples of the fluoran-based leuco dye include 3-alkyl-2-anilino-6-(N,N-dialkylamino)fluoran such as 2-anilino-6-diethylamino-3-methylfluoran, 2-anilino-6-(N-n-propyl-N-methylamino)-3-methylfluoran, 2-anilino-6-(N-sec-butyl-N-ethylamino)-3-methylfluoran, 2-anilino-6-di(n-butyl)amino-3-methylfluoran, and 6-(N-isopentyl-N-ethyl)amino-3-methyl-2-o-chloroanilinofluoran; 3-alkyl-2-anilino-6-(N-alkoxyalkyl-N-alkylamino)fluoran such as 2-anilino-6-(N-ethoxypropyl-N-ethyl)amino-3-methylfluoran; 3-alkyl-2-anilino-6-(N-alkyl-N-cycloalkylamino)fluoran such as 2-anilino-3-methyl-6-(N-cyclohexyl-N-methylamino)fluoran; 3-alkyl-2-anilino-6-(N-alkyl-N-arylamino)fluoran such as 2-anilino-3-methyl-6-(N-methyl-N-p-toluidino)fluoran and 2-anilino-3-methyl-6-(N-ethyl-N-p-toluidino)fluoran; 2-anilino-3-alkylfluoran compounds having a cyclic amino group at the sixth position, such as 2-anilino-3-methyl-6-pyrrolidinofluoran; 2-halogenated anilino-6-dialkylaminofluoran such as 2-(o-chloroanilino)-6-diethylaminofluoran; dialkylamino-dialkylfluoran such as 3-dimethylamino-5-methyl-7-methylfluoran and 3-diethylamino-6-methyl-8-methylfluoran; and halogenated fluoran having a dialkylamino group such as 3-dibutylamino-6-methyl-7-bromofluoran and 3-diethylamino-7-chlorofluoran.

Examples of the phthalide-based leuco dye include 6-(dimethylamino)-3,3-bis[p-(dimethylamino)phenyl]phthalide (crystal violet lactone), 3-[2,2-bis(1-ethyl-2-methyl-3-indolyl)vinyl]-3-(4-diethylaminophenyl)phthalide, 3-[1,1-bis(4-diethylaminophenyl)ethylene-2-yl]-6-dimethylaminophthalide, 3,3-bis(1-n-butyl-2-methylindole-3-yl)phthalide, and 3,3-bis(4-diethylamino-2-ethoxyphenyl)-4-azaphthalide.

As the developer, an electron acceptor such as an acidic substance may be used. The developer may be appropriately selected depending on the type of the leuco dye. A known developer may be used. Examples of the developer include acidic inorganic matters (bentonite, zeolite, silica gel, and the like), and carboxylic acids (aliphatic mono-carboxylic acids such as stearic acid; polycarboxylic acids such as oxalic acid and maleic acid; aliphatic hydroxycarboxylic acids such as tartaric acid, citric acid, and succinic acid; and aromatic carboxylic acids such as benzoic acid), as well as compounds having a phenolic hydroxyl group. One of these developers may be used alone, or two or more thereof may be used in combination.

Examples of the compounds having a phenolic hydroxyl group include hydroxyarene (for example, 4-tert-butylphenol, 4-phenylphenol, and β-naphthol); hydroxyarene carboxylic acids (for example, salicylic acid, 3-tert-butylsalicylic acid, 2-hydroxy-6-naphthoic acid, 2-hydroxy-p-tolilic acid, and 4-hydroxyphthalic acid); hydroxyarene carboxylic acid ester (for example, 5-hydroxyphthalic acid dimethyl, methyl-4-hydroxybenzoate, and 4-hydroxybenzoic acid ethyl); hydroxyarene carboxylic acid amide such as salicylanilide; metal salts of hydroxyarene carboxylic acids (for example, zinc salicylate, 2-hydroxy-6-zinc naphthoate, and 3,5-di-tert-tin butyl salicylate); bisphenols (for example, hydroxy biphenyl such as 2,2'-dihydroxydiphenyl, 4,4'-isopropylidendiphenol, and 4,4'-isopropylidenbis(2-chlorophenol)); novolac-type phenolic resins; diarylsulfone having a phenolic hydroxyl group (for example, di(4-hydroxyphenyl) sulfone and 4,2'-dihydroxydiphenylsulfone); and diaryl sulfide having a phenolic hydroxyl group (bis(4-hydroxyphenyl)sulfide).

The color developing material such as the leuco dye and the developer contained in the recording layer 3 are usually particulate. Therefore, even if the particles themselves of the color developing material are transparent, diffuse reflection of light causes the transparency of the transparent adhesive tape to be inhibited. Especially, when the particle diameter of the color developing material is large, the diffuse reflection of light is further increased by the particles. This causes the transparency of the transparent adhesive sheet 1 to be further reduced. To address this concern, the diffuse reflection can be suppressed by controlling to reduce the particle diameter of the color developing material. Accordingly, the transparency of the transparent adhesive sheet 1 can be increased. From such a viewpoint, the average particle diameter of the color developing material such as the leuco dye and the developer may be, for example, 0.1 to 1 μm, preferably 0.1 to 0.7 μm, and further preferably 0.1 to 0.6 μm. It is noted that as described herein, the average particle diameter refers to a 50% average particle diameter (median diameter) in a particle size distribution by volume standard measured using a Microtrac laser diffraction and scattering particle size analyzer.

The color developing temperature of the color developing material differs depending on the type of the color developing material. The type of the color developing material may be appropriately selected such that heat is generated at a desired heat generation temperature corresponding to, for example, the temperature of a heating body such as a thermal head used in printing.

The content of the color developing material in the recording layer 3 can be appropriately selected according to, for example, the absorbance in the visible light range in a state where the color developing material develops color. This content is, for example, 10 to 70% by mass, preferably 20 to 60% by mass, and further preferably 30 to 50% by mass. When the color developing material includes the leuco dye and the developer, a mass ratio of the developer to the leuco dye (=developer/dye) can be appropriately selected according to the types of the leuco dye and the developer. This mass ratio is, for example, 1/1 to 5/1, and preferably 1.5/1 to 3/1.

The recording layer 3 may include a binding agent for binding the color developing material. As the binding agent, resins, macromolecules (synthetic macromolecules and natural macromolecules), and the like can be used. Preferred examples of the binding agent include a hydrophilic or water-soluble binding agent, and a water-dispersible binding agent.

Examples of such a binding agent include vinyl acetate resins or saponified products thereof (for example, homopolymers or copolymers of vinyl acetate, such as polyvinyl acetate, vinyl acetate-maleic anhydride copolymer, and vinyl acetate-vinyl chloride copolymer, polyvinyl alcohol (PVA), and modified PVA (saponified products of vinyl acetate copolymers)), olefin resins (for example, copolymers of olefin and a polymerizable unsaturated carboxylic acid or an anhydride thereof, such as isopropylene-maleic anhydride copolymer, isobutylene-maleic anhydride copolymer, diisobutylene-maleic anhydride copolymer, and methyl vinyl-maleic anhydride copolymer), styrene resins (for example, polystyrene, and copolymers of styrene and a polymerizable unsaturated carboxylic acid or an anhydride thereof, such as styrene-maleic anhydride copolymer), polyamide resins (for example, polyamide, polyester amide, and polyamide imide), vinyl cyanide resins (for example, polyacrylonitrile, and acrylonitrile copolymer), acrylic resins (for example, poly(meth)acrylic acid, polyacrylic acid ester, copolymer of (meth)acrylic acid and (meth)acrylic acid ester such as acrylic acid-acrylic acid ester copolymer, and acrylamide resins such as polyacrylamide and modified polyacrylamide), alkyl vinyl ether resins (for example, polymethyl vinyl ether), vinyl chloride or vinylidene chloride resins (for example, polyvinyl chloride, polyvinylidene chloride, and copolymer containing vinyl chloride and/or vinylidene chloride as a monomer unit), urethane resins (for example, polyether polyurethane and polyester polyurethane), polyvinylpyrrolidone, rubber-like polymers (for example, styrene-butadiene rubber (SBR) and acrylic rubber), rubber (for example, gum arabic), cellulose derivatives (for example, methyl cellulose, carboxymethyl cellulose, hydroxyethyl cellulose, and cellulose ether such as hydroxypropyl cellulose), polysaccharides (for example, starch and modified starch), and protein (casein, gelatine, and glue).

Examples of the polymerizable unsaturated carboxylic acid and an anhydride thereof as a copolymerizable monomer in the above-described binding agent include carboxylic acids having an ethylene-based unsaturated bond or an anhydride thereof, such as (meth)acrylic acid, maleic acid, fumaric acid, and maleic anhydride. By using the polymerizable unsaturated carboxylic acid or an anhydride thereof as a copolymerizable monomer, a carboxyl group or an acid anhydride group is introduced in resin. This imparts hydrophilicity or water-solubility to resin. It is noted that acrylic acid and methacrylic acid are collectively referred to as (meth)acrylic acid. Also, acrylic acid ester and methacrylic acid ester are collectively referred to as (meth)acrylic acid ester. Furthermore, by introducing an amide group or an amino group into acrylamide resin, hydrophilicity and water-solubility can be imparted to the resin.

Of the above-described binding agents, one may be used alone, or two or more may be used in combination. Among these, acrylic resins, saponified products of vinyl acetate resins (for example, PVA and modified PVA), or rubber-like polymers such as SBR are preferably used. The saponified products of vinyl acetate resins have high hydrophilicity or water-solubility. For this reason, the compatibility between the color developing material and the base material layer 2, and the film formation properties are high, thereby to be likely to increase transparency. Also, the use of acrylic resins or rubber-like polymers is likely to increase bonding properties while ensuring high transparency.

The amount of the binding agent relative to 100 parts by mass of the color developing material is, for example, 10 to 70 parts by mass, preferably 20 to 65 parts by mass, and further preferably 35 to 60 parts by mass.

The recording layer 3 may further include a filler and/or a lubricant. Examples of the filler include inorganic fillers and organic fillers (for example, various resin particles including styrene resins such as polystyrene (PS), olefin resins such as polyethylene (PE), acrylic resins such as polymethyl methacrylate (PMMA), and urea resins). Examples of the inorganic fillers include mineral-based fillers (for example, active terra alba, kaolin such as kaolinite, talc, clay, and diatomaceous earth), silicon-containing compounds (for example, silicon oxides such as white carbon and silica gel, and silicate salts such as aluminum silicate), and metal compounds (metal oxides such as magnesium oxide, aluminum oxide, titanium oxide, and zinc oxide, metal hydroxides such as magnesium hydroxide and aluminum hydroxide, and metal inorganic acid salts such as magnesium carbonate, calcium carbonate, and barium sulfate). Among these fillers, one may be used alone, or two or more may be used in combination.

The amount of the filler relative to 100 parts by mass of the color developing material is, for example, 5 to 40 parts by mass, and preferably 15 to 30 parts by mass.

Examples of the lubricant include waxes (for example, paraffin wax, ester waxes such as carnauba wax, and polyolefin waxes such as polyethylene wax), oil and fat (for example, higher fatty acids such as oleic acid, higher fatty acid salts (for example, metal soap such as zinc stearate), animal oil and fat such as whale oil, and vegetable oil and fat), and silicone oil. Among these lubricants, one may be used alone, or two or more may be used in combination.

The amount of the lubricant relative to 100 parts by mass of the color developing material is, for example, 1 to 40 parts by mass, preferably 5 to 35 parts by mass, and further preferably 10 to 30 parts by mass.

When the binding agent, the filler, and the lubricant are contained in a particulate form in the recording layer 3, the particle diameter of the particles is preferably small similarly to the color developing material, from the viewpoint of inhibition of diffuse reflection. The average particle diameter of these particles is, for example, 1 µm or less, preferably 0.5 µm or less, and further preferably 0.4 µm or less. The average particle diameter is preferably small. The lower limit of the average particle diameter is, for example, 0.01 µm or more.

This recording layer 3 preferably contains a first diffuse reflection suppression component for suppressing the diffuse reflection in the transparent adhesive sheet 1. Such suppression of the diffuse reflection on the particles contained in the recording layer 3 further increases the transparency of the transparent adhesive sheet 1.

Also, this first diffuse reflection suppression component preferably includes an organic material having a melting point lower than the color developing temperature of the color developing material. The first diffuse reflection suppression component melts when the temperature reaches a temperature not lower than the melting point of the first diffuse reflection suppression component due to heating in, for example, a step of forming the recording layer 3, a step of forming the intermediate layer 4, the release layer 5, and the like, or a step of causing the color developing material to develop color. The melted first diffuse reflection suppression component is embedded in a space between the particles contained in the recording layer 3 and in a space formed at an interface between the base material layer 2 and the recording layer 3, thereby reducing unevenness between the particles and at the interface. As a result, the diffuse reflection in the recording layer 3 and at the interface between the base material layer 2 and the recording layer 3 is suppressed. This can improve the transparency of the transparent adhesive sheet 1.

For exerting the above-described function, the melting point of the first diffuse reflection suppression component is preferably lower than the temperature when forming each layer, especially the recording layer 3, and the color developing temperature of the color developing material. When the melting point of the first diffuse reflection suppression component is lower than the color developing temperature of the color developing material, the first diffuse reflection suppression component melts at least when printing is performed on the transparent adhesive sheet 1. Therefore, the above-described effect can be exerted.

An example of such a material includes an organic material. Examples of this organic material include resins such as polyethylene, organic fillers, waxes, and/or oils and fats. Of the first diffuse reflection suppression components, one may be used alone, or two or more may be used in combination. There are various types of paraffins (paraffin waxes) each having a different melting point. For this reason, the use of paraffin wax allows the melting temperature to be optionally adjusted. Therefore, paraffin is a particularly preferred organic material. The melting point of the first diffuse reflection suppression component is further preferably lower than the temperatures when forming the recording layer 3, the intermediate layer 4, the release layer 5, and the like. When the melting point is lower than the temperatures for forming these layers, the first diffuse reflection suppression component melts when forming the layers, thereby enabling the above-described effect to be obtained. In particular, the melting point of the first diffuse reflection suppression component is further preferably lower than the temperature when forming the recording layer 3.

The melting point of the first diffuse reflection suppression component which meets the above-described condition is specifically, for example, lower than 80° C., preferably 65° C. or lower, and further preferably 50° C. or lower. The lower limit of the melting point of the first diffuse reflection suppression component is, but not particularly limited to, for example, 35° C. or higher.

The form of the first diffuse reflection suppression component before melting in the recording layer 3 is preferably particulate. The average particle diameter of the first diffuse reflection suppression component is, for example, 1 μm or less, preferably 0.05 to 0.5 μm, and further preferably 0.1 to 0.4 μm. When the average particle diameter falls within such a range, the first diffuse reflection suppression component is likely to be dispersed in the recording layer 3. Furthermore, when the first diffuse reflection suppression component melts, it can relatively uniformly melt. In addition, even when the first diffuse reflection suppression component exists in a particulate form in the recording layer 3 without melting, diffuse reflection is also likely to be suppressed.

The amount of the first diffuse reflection suppression component relative to 100 parts by mass of the color developing material is, for example, 1 to 40 parts by mass, preferably 5 to 35 parts by mass, and further preferably 10 to 30 parts by mass. When the amount of the first diffuse reflection suppression component falls within such a range, diffuse reflection in the transparent adhesive sheet 1, particularly in the recording layer 3 or at the interface between the recording layer 3 and the base material layer 2, can be effectively suppressed without damaging the clarity of the print.

Such a first diffuse reflection suppression component may be a component independent from other components contained in the recording layer 3. However, a component having another function may function as the first diffuse reflection suppression component. For example, among the binding agent, the filler, and the lubricant, a material which melts at relatively low temperature melts in, for example, the step of forming the recording layer 3, the step of forming the intermediate layer 4, the release layer 5, and the like, or the step of causing the color developing material to develop color. Therefore, such a material functions as the first diffuse reflection suppression component. For example, the above-described resins such as polyethylene, organic fillers, waxes, and oils and fats may function as the binding agent and/or as the first diffuse reflection suppression component.

For forming the recording layer 3, for example, constituent components are firstly dispersed in a dispersion medium to prepare a coating liquid. Next, the coating liquid is applied on a surface on the front surface side of the base material layer 2. Lastly, the coated film is dried. When dispersing the constituent components in the dispersion medium, a known mixer or a known pulverizer such as a sand mill and a bead mill may be used. As the dispersion medium, organic solvents such as alcohol, ketone, and nitrile may be used. However, water is preferably used.

The coated film can be dried under atmospheric pressure or reduced pressure. When the temperature of the transparent adhesive sheet 1 during drying is higher than the melting point of the first diffuse reflection suppression component due to temperature control, the first diffuse reflection suppression component can be melted. Therefore, diffuse reflection can be effectively suppressed. On the other hand, for preventing the recording layer 3 from thermally reacting, the temperature of the transparent adhesive sheet 1 needs to be controlled not to become excessively high. From such a viewpoint, the temperature may be appropriately selected within the range of, for example, 25 to 100° C. More specifically, the temperature is preferably 50 to 100° C., and further preferably 80 to 100° C.

The weight of the recording layer 3 per unit area of the base material layer 2 is, for example, 1 to 10 $g/m^2$, and preferably 2 to 6 $g/m^2$, in terms of dry weight. When the weight of the recording layer 3 falls within such a range, the thickness of the recording layer 3 can be defined in an appropriate range. Therefore, printing properties and transparency are likely to be balanced.

(Intermediate Layer 4)

In the present embodiment, an intermediate layer 4 is further disposed on the front surface side of the recording layer 3 so as to be in contact with the recording layer 3. The intermediate layer 4 is not an essential structure. However, the disposition of the intermediate layer 4 can protect the recording layer 3, thereby increasing the water resistance, oil resistance, chemical resistance, and the like, of the transparent adhesive sheet 1. From such a viewpoint, resin is preferably used. The inclusion of resin may improve film formation properties of the intermediate layer 4. As such resin, resins which have been described as examples of the binding agent in the recording layer 3, and the like, can be used. For example, when acrylic resins, saponified products of vinyl acetate resins (for example, PVA and modified PVA), or rubber-like polymers such as SBR, are contained in the intermediate layer 4, the transparent adhesive sheet 1 is likely to have increased water resistance. The use of hydrophilic resins, water-soluble resins, water-dispersible resins, or the like, facilitates the improvement of oil resistance.

The intermediate layer 4 also preferably includes a second diffuse reflection suppression component for suppressing diffuse reflection in the transparent adhesive sheet 1. The suppression of diffuse reflection on the particles contained in the intermediate layer 4 further enhances the transparency of the transparent adhesive sheet 1. Such a second diffuse reflection suppression component may be a component independent from other components contained in the intermediate layer 4. However, a component having another function may function as the second diffuse reflection suppression component. The above-described hydrophilic resins or water-soluble resins have high film formation properties. Therefore, such resins are likely to be impregnated into the recording layer 3, which is hydrophilic, when forming the intermediate layer 4 on the recording layer 3. This facilitates formation of the smooth intermediate layer 4. Such formation of the smooth intermediate layer 4 suppresses diffuse reflection in the recording layer 3 and at an interface between the recording layer 3 and the intermediate layer 4. This can further enhance the transparency of the transparent adhesive sheet 1. Thus, hydrophilic resins and water-soluble resins function as the second diffuse reflection suppression component for suppressing diffuse reflection in the transparent adhesive sheet 1.

As such hydrophilic resins or water-soluble resins, acrylic resins (particularly, for example, acrylic resins in which hydrophilic groups such as a carboxyl group, acid anhydride group, amino group, and amide group are introduced) is preferably used other than saponified products of vinyl acetate resins such as PVA. Saponified products of vinyl acetate resins, especially PVA having a high saponification degree, and the like, contain many hydroxyl groups. Therefore, these resins have high hydrophilicity and water-solubility.

Such hydrophilic resins and water-soluble resins may be contained as a shell material of a core shell-type particle. The core material in this case is not particularly limited, and may be appropriately selected from the hydrophilic resins or water-soluble resins described above as examples. However, these resins preferably contain hydrophobic resins such as crosslinked resins. The inclusion of hydrophobic resins in a core allows the core to remain in the intermediate layer 4 even after the hydrophilic resins or water-soluble resins contained in the shell are impregnated into the recording layer 3. This can improve water resistance. At the same time, since compatibility with the release layer 5 is high, diffuse reflection at, for example, the interface between the intermediate layer 4 and the release layer 5 can be suppressed. An example of the core shell-type particles includes known core shell-type particles containing acrylic-based resins such as acrylamide resins (trade name "Barrier Star" (manufactured by Mitsui Chemicals, Inc.)).

The intermediate layer 4 can be formed by drying a coated film obtained by coating a surface on the front surface side of the recording layer 3 with a coating liquid containing resin. The form of the coating liquid is, for example, a dispersion liquid or an emulsion. Examples of a dispersion medium to be used in the coating liquid include the dispersion media described as examples in the recording layer 3. The coating liquid may contain a surfactant and the like as necessary. When resin includes water-soluble resins or hydrophilic resins, the water-soluble resins or hydrophilic resins can be impregnated into the recording layer 3 during the drying of the coated film. The drying condition is not particularly limited, as long as the dispersion medium in the coating liquid can be removed under the condition. The drying condition may be the same as the drying condition when forming the recording layer 3.

The weight of the intermediate layer 4 per unit area of the recording layer 3 is, for example, 0.1 to 5 g/m$^2$, and preferably 0.5 to 3 g/m$^2$, in terms of dry weight. When the weight of the intermediate layer 4 falls within such a range, barrier properties are likely to be ensured while ensuring transparency.

(Adhesive Layer 6)

An adhesive layer 6 contains an adhesive agent. An example of a usable adhesive agent includes a known acrylic-based adhesive agent, silicone-based adhesive agent, and rubber-based adhesive agent. The adhesive agent may be any of a solvent-type adhesive agent, a solventless-type adhesive agent, and an emulsion-type adhesive agent.

The adhesive layer 6 can be formed by coating a surface on the back surface side of the base material layer 2 with an adhesive agent. The order of forming the adhesive layer 6 is not particularly limited. The adhesive layer 6 may be formed before forming the recording layer 3. Alternatively, the adhesive layer 6 can be formed after having formed the recording layer 3, the intermediate layer 4, or the release layer 5.

The weight of the adhesive layer 6 per unit area of the base material layer 2 is, for example, 1 to 20 g/m$^2$, and preferably 5 to 15 g/m$^2$, in terms of dry weight. When the weight of the adhesive layer 6 falls within such a range, appropriate adhesiveness and transparency are likely to be ensured.

(Release Layer 5)

In the transparent adhesive sheet 1, a release layer 5 is formed on the front surface side of the recording layer 3. The release layer 5 is disposed on the outermost front surface side to be released from the adhesive layer 6 when the wound transparent adhesive sheet 1 is used.

The release layer 5 contains a release agent or a mold release agent. Examples of the release agent or the mold release agent include common silicone resins and fluorine resins, known as a release agent or a mold release agent for plastic molding. Among these release agents, one may be used alone, or two or more may be used in combination, depending on the type of the adhesive agent.

The release layer 5 may contain known additives, for example, a lubricant for enhancing the slip of a thermal head, as necessary.

A region where the release layer 5 is formed is not particularly limited, as long as the adhesive layer 6 can be easily released when the transparent adhesive sheet 1 is wound around. The release layer 5 may be formed at least in a region on an exterior circumference facing to the adhesive layer 6. The release layer 5 may be formed on a part of the outermost front surface side, or may be formed on the whole.

The release layer 5 can be formed by coating the outermost front surface side with a release agent and drying the coated film. The weight of the release layer 5 is, for example, 0.1 to 5 g/m$^2$, and preferably 0.1 to 2.5 g/m$^2$, in terms of dry weight. When the weight of the release layer 5 falls within such a range, release properties and transparency are likely to be ensured.

Figure 2:
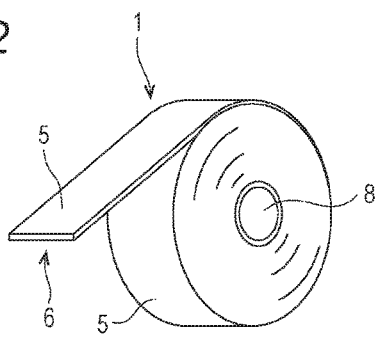
FIG. 2 is a perspective view schematically illustrating a state in which the transparent adhesive sheet of FIG. 1 is wound around a core material.
Figure 3:
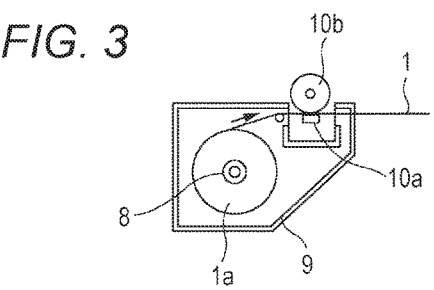
FIG. 3 is a schematic view for explaining a printing method of the wound transparent adhesive sheet of FIG. 2.

FIG. 3 is a schematic view for explaining a method of printing on the wound transparent adhesive sheet 1 of FIG. 2. It is noted that the wound transparent adhesive sheet 1 is sometimes referred to as merely a wound body 1a below.

The wound body 1a is the strap-shaped transparent adhesive sheet 1 wound around the core material 8. The wound body 1a is attached to a thermal transfer printer, part of which is illustrated, in a state of being housed in a cassette 9. The thermal transfer printer includes a drive roller 10b for unwinding the transparent adhesive sheet 1 from the wound body 1a, and a thermal head 10a for heating the transparent adhesive sheet 1. The strap-shaped transparent adhesive sheet 1, which has been unwound from the wound body 1a by the drive roller 10b, is supplied to the thermal head 10a portion. In this manner, the transparent adhesive sheet 1 is heated by being brought into contact with the thermal head 10a. The color developing material in the recording layer 3 of the transparent adhesive sheet 1 is heated by the thermal head 10a to develop color. Accordingly, printing is performed on the transparent adhesive sheet 1. The transparent adhesive sheet 1, on which printing has been performed, is discharged outside the thermal transfer printer. In this manner, the thermal transfer printer can simply perform printing on the transparent adhesive sheet 1 during in use. Therefore, the transparent adhesive sheet 1 is also likely to be used in a small amount of commercial products.

According to the above-described present embodiment, the following effects, which has been described above, can be obtained.

(1) The transparent adhesive sheet according to the present embodiment includes the recording layer 3 containing a color developing material that thermally develops color. This enables printing to be performed by heating during in use.

(2) The transparent adhesive sheet according to the present embodiment includes the base material layer 2 formed with a transparent material, the recording layer 3 that is transparent in the state before it develops color, and the adhesive layer 6 formed with an adhesive agent for bonding to an adherend, and therefore can be used as a transparent adhesive tape.

(3) The transparent adhesive sheet according to the present embodiment has an opacity in accordance with JIS P8138 of not more than 25% in the state before the recording layer develops color. Therefore, the opacity of the transparent adhesive sheet is low. Accordingly, the transparency of the transparent adhesive sheet is high. Thus, the likelihood where the adherend can be visually recognized is increased.

(4) The first diffuse reflection suppression component contained in the recording layer of the transparent adhesive sheet according to the present embodiment suppresses diffuse reflection. Therefore, the transparency of the transparent adhesive sheet is further increased.

(5) Also, the first diffuse reflection suppression component includes an organic material having a melting point lower than the color developing temperature of the color developing material. Therefore, the organic material melts at least when color is developed, thereby enabling the exertion of the diffuse reflection suppressing effect.

(6) Furthermore, the organic material contains paraffin. There are many types of paraffins. For this reason, selection and/or mixture of paraffins enables the melting point of the organic material to be freely adjusted. Therefore, the melting point can be easily lowered compared to the color developing temperature of the color developing material. Also, paraffins are general-purpose and inexpensive materials.

(7) The intermediate layer 4 of the transparent adhesive sheet according to the present embodiment protects the recording layer 3. This can suppress the color development of the recording layer caused by friction or the like. The intermediate layer 4 also protects the recording layer 3 from external environments such as water and oil.

(8) The intermediate layer 4 of the transparent adhesive sheet according to the present embodiment contains the second diffuse reflection suppression component. Therefore, the transparency of the transparent adhesive sheet is further increased.

(9) Also, when the second diffuse reflection suppression component contains hydrophilic resins or water-soluble resins, and furthermore, when the recording layer 3 is hydrophilic, the hydrophilic resins or water-soluble resins are impregnated from the interface with the intermediate layer 4 into the hydrophilic recording layer 3. This suppresses diffuse reflection at the interface between the recording layer 3 and the intermediate layer 4 and in the recording layer 3.

(10) Also, when the second diffuse reflection suppression component is core shell-type particles containing hydrophilic resins or the water-soluble resins in the shell, and furthermore, when the recording layer 3 is hydrophilic, the shell consisting of the hydrophilic resins or water-soluble resins is impregnated from the interface with the intermediate layer 4 into the hydrophilic recording layer 3. This suppresses diffuse reflection at the interface between the recording layer 3 and the intermediate layer 4 and in the recording layer 3. Also, the inclusion of hydrophobic resins in the core allows the core to remain in the intermediate layer 4 even after the hydrophilic resins or water-soluble resins contained in the shell have been impregnated into the recording layer 3. Therefore, there is a possibility of improving water resistance.

(11) The transparent adhesive sheet 1 according to the present embodiment is wound around a circumferential surface of the tubular or columnar core material 8. Therefore, even the long transparent adhesive sheet can be compactly housed. Furthermore, such a transparent adhesive sheet 1 is suitable for storage and carrying.

Second Embodiment

Hereinafter, the second embodiment of the present invention will be described with reference to FIG. 4. It is noted that the second embodiment is the same as the first embodiment except that the layer structure is partly different. Therefore, description on the same portion will be omitted. Also, the structure having the substantially same function will be described using the same reference numeral.

Figure 4:
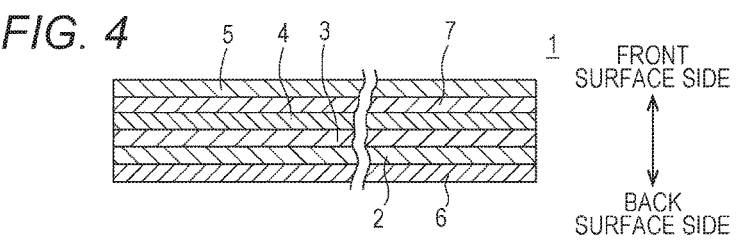
FIG. 4 is a schematic cross-sectional view of a transparent adhesive sheet according to a second embodiment.

As illustrated in FIG. 4, in the present embodiment, the transparent adhesive sheet 1 includes a protective layer 7, for protecting the recording layer 3 or the intermediate layer 4, on the front surface side of the intermediate layer 4.

(Protective Layer 7)

The protective layer 7 is disposed for protecting the recording layer 3 and the intermediate layer 4. Also, the protective layer 7 sometimes has a function of increasing the contact properties between a heating body such as a thermal head and the transparent adhesive sheet 1 during printing so that the recording layer 3 smoothly develops color.

Also, the protective layer 7 sometimes contains all or any of a filler, a binding agent, and a lubricant. The inclusion of a filler can provide appropriate layer strength to the protective layer 7. The filler can be appropriately selected from the examples described above on the recording layer 3. In particular, organic fillers such as PS particles and PMMA particles, metal compounds (for example, metal salts) such as calcium carbonate, and the like are preferred.

The filler particularly preferably contains silicon oxide or colloidal silica that is a colloid of silicon oxide hydrate. Colloidal silica generally has a small particle diameter. Therefore, diffuse reflection in the protective layer 7 is suppressed. As a result, the protective layer 7 has improved transparency. Accordingly, images and letters formed on the recording layer 3 located on the back surface side to the protective layer 7 are highly likely to be clearly recognized through the protective layer 7 from the front surface side.

For obtaining the above-described effect, the average particle diameter of colloidal silica is, for example, 500 nm or less, preferably 400 nm or less, and further preferably 300 nm or less. Also, the protective layer 7 may contain a group of particles of a plurality of colloidal silica each having a different particle size distribution. For example, a combination of colloidal silica having an average particle diameter of not less than 1 nm and less than 20 nm and colloidal silica having an average particle diameter of, for example, 20 to 500 nm, and preferably 20 to 100 nm, may be used. The use of such a combination of a group of small particles and a group of large particles facilitates maintenance of high transparency even while increasing the strength of the protective layer 7.

The content of the colloidal silica in the protective layer 7 is, for example, 10 to 65% by mass, preferably 10 to 60% by mass, further preferably 10 to 50% by mass, and particularly 25 to 50% by mass. When the content of the colloidal silica falls within such a range, the strength of the protective layer 7 and the high transparency are likely to be balanced.

Examples of the binding agent in the protective layer 7 include acrylic resins such as poly(meth)acrylic acid, epoxy resins, and thermosetting resins such as phenolic resin, as well as the above-described examples of the binding agent in the recording layer 3. As the thermosetting resins, self-crosslinkable thermosetting resins may be used, or a composition containing a base resin and a crosslinking agent may be used. An example of such a composition includes a composition containing an acrylic resin having a carboxyl group such as polyacrylic acid, and a crosslinking agent of a carboxyl group. As the crosslinking agent, a known crosslinking agent such as ammonium zirconium carbonate can be used depending on the type of the functional group possessed by the base resin. Also, as the thermosetting resins, a substance containing a curing agent, a curing accelerator, or the like may be used as necessary. Of the binding agents, one may be used alone, or two or more may be used in combination.

The content of the binding agent in the protective layer 7 is, for example, 10 to 70% by mass, preferably 20 to 60% by mass, and further preferably 25 to 50% by mass. Also, the amount of the binding agent relative to 100 parts by mass of colloidal silica in the protective layer 7 is, for example, 50 to 500 parts by mass, and preferably 80 to 200 parts by mass.

When a lubricant is contained in the protective layer 7, the lubricant can be appropriately selected from the examples described above on the recording layer 3. The average particle diameter of the lubricant is, for example, 0.01 to 7 μm, and preferably 0.05 to 6 μm.

Also, when colloidal silica is used in combination with another filler, the amount of the filler other than colloidal silica and the lubricant, relative to 100 parts by mass of the colloidal silica, is, for example, 1 to 40 parts by mass, preferably 5 to 35 parts by mass, and further preferably 10 to 30 parts by mass. When the amount of the filler and the lubricant falls within such a range, transparency is likely to be ensured while maintaining the strength of the protective layer 7.

For forming the protective layer 7, for example, constituent components of the protective layer 7 are firstly dispersed in a dispersion medium to prepare a coating liquid. Next, the coating liquid is applied on the surface on the front surface side of the recording layer 3 or the intermediate layer 4. Lastly, the coated film is dried. Examples of the dispersion medium to be used in the coating liquid include the examples described above on the recording layer 3, and the like. The drying condition is not particularly limited, as long as the dispersion medium in the coating liquid can be removed under the condition. The drying condition may be the same as the drying condition % when forming the recording layer 3.

The weight of the protective layer 7 per unit area is, for example, 0.1 to 5 g/m$^2$, and preferably 0.5 to 2.5 g/m$^2$, in terms of dry weight. When the weight of the protective layer 7 falls within such a range, transparency and appropriate strength are likely to be ensured.

According to the above-described present embodiment, the following effects can be obtained, in addition to the effects of (1) to (11) as already described in the first embodiment.

(12) The transparent adhesive sheet according to the present embodiment has the protective layer 7 that protects the recording layer 3. This can suppress the color development of the recording layer 3 caused by friction or the like. The protective layer 7 can also protect the recording layer 3 from external environments such as water and oil.

(13) Also, the inclusion of a binding agent and a filler in the protective layer 7 strengthens the protective layer 7.

Third Embodiment

Figure 5:
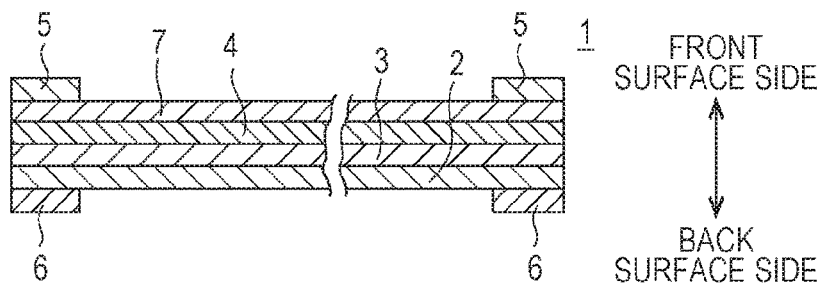
FIG. 5 is a schematic cross-sectional view of a transparent adhesive sheet according to a third embodiment.

Hereinafter, the third embodiment of the present invention will be described with reference to FIGS. 5 to 7. It is noted that the third embodiment is the same as the second embodiment or the first embodiment except that the layer structure is partly different. Therefore, description of the same portion will be omitted. Also, a structure having the substantially same function will be described using the same reference numeral. It is noted that in the following description, a longitudinal direction and a transverse direction refer to the directions indicated by arrows in the drawing.

As illustrated in FIG. 4, in the second embodiment, the adhesive layer 6 was formed on the whole surface of the outermost back surface side. In contrast to this, in the transparent adhesive sheet 1 according to the present embodiment, the adhesive layer 6 is formed on a part of the back surface side as illustrated in FIG. 5. Accordingly, the release layer 5 is formed on a part of the outermost front surface side corresponding to the portion of the outermost back surface side in which the adhesive layer 6 is formed. According to such a structure, the use amount of the adhesive agent for constituting the adhesive layer 6 and the use amount of the release agent for forming the release layer 5 may be reduced in some cases. Furthermore, the area of the adhesive layer 6 bonded to an adherend is small. Therefore, releasing after bonding is easier compared to when the adhesive layer 6 is formed on the whole of the outermost back surface. Consequently, for example, the transparent adhesive sheet according to the present embodiment can be suitably used for an application in which the transparent adhesive sheet 1 needs to be temporarily bonded to an adherend.

Figure 6:
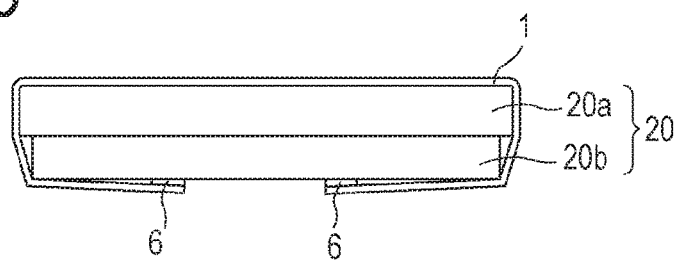
FIG. 6 is a side view schematically illustrating a state in which the transparent adhesive sheet of FIG. 5 is bonded to a container.
Figure 7:
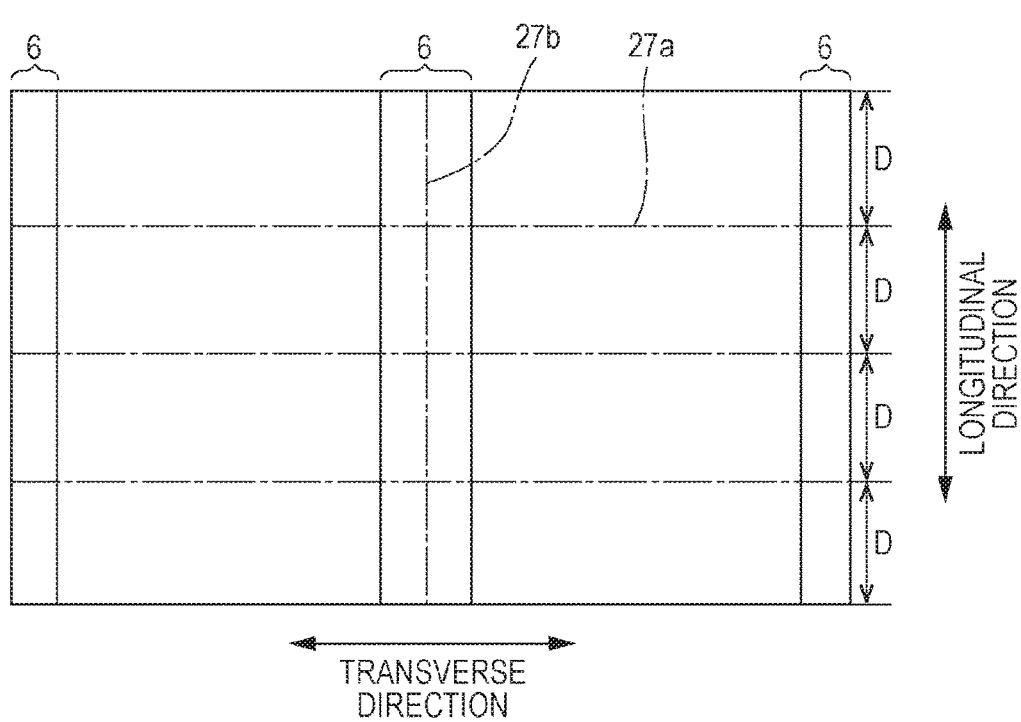
FIG. 7 is a plan view schematically illustrating an example of a method of supplying the transparent adhesive sheet according to the third embodiment.

Also, when the adhesive layer 6 is disposed on both ends in the longitudinal direction, the transparent adhesive sheet 1 can be suitably used as a strapping sheet for a container as illustrated in FIG. 6. FIG. 6 is a side view schematically illustrating the state when the transparent adhesive sheet 1 is bonded to a container. The transparent adhesive sheet 1 is strapped around a container 20 including a lid body 20a and a container body 20b. At the same time, the adhesive layers 6 and 6 disposed on both ends are bonded to the bottom of the container body, so that the transparent adhesive sheet 1 straps and seals the container 20.

Even in such a use form, the transparent adhesive sheet 1 is transparent, and therefore never obscures the container 20. Therefore, the container 20 can be sealed, without damaging the design features of the container 20, in a state where the contents can be visually inspected. Furthermore, printing can be always performed on the transparent adhesive sheet 1. Therefore, the manufacture date or the like can be displayed when sealing.

The transparent adhesive sheet 1 according to such a form may be supplied in a shape of being wound around the core material 8 as illustrated in FIG. 2. The transparent adhesive sheet 1 according to such a form may also be supplied as a large-sized sheet as illustrated in FIG. 7. The adhesive layer 6 extends in the longitudinal direction on the back surface side at both ends and a center in the transverse direction of the transparent adhesive sheet 1.

This large-sized sheet is cut in the transverse direction (that is, cut along dashed line 27a) at a predetermined distance D along the longitudinal direction. This large-sized sheet is also cut in the longitudinal direction (cut along dashed line 27b) so as to divide the adhesive layer 6 at the center in the transverse direction. Accordingly, the strap-shaped transparent adhesive sheet 1 can be obtained.

According to the above-described present embodiment, the following effects can be obtained, in addition to the effects of (1) to (11) as already described in the first embodiment, and the effects of (12) and (13) as already described in the second embodiment.

(14) The transparent adhesive sheet according to the present embodiment includes the adhesive layer 6 formed on a part of the back surface side. Therefore, the adhesive agent can be saved and reduced.

(15) Furthermore, the release layer 5 may also be formed only on a part of the front surface side facing to the adhesive layer 6. Therefore, the release agent can also be saved.

(16) In addition, since the adhesive layer 6 is formed on a part of the back surface side, the area in which the adhesive layer 6 is formed can be adjusted. Accordingly, adhesive strength can be easily changed.

(17) Also, when the adhesive layer 6 is disposed on both ends of the back surface side, the transparent adhesive sheet according to the present embodiment can be suitably used as a strap for sealing.

It is noted that the above-described embodiments may be modified as below.

Figure 8:
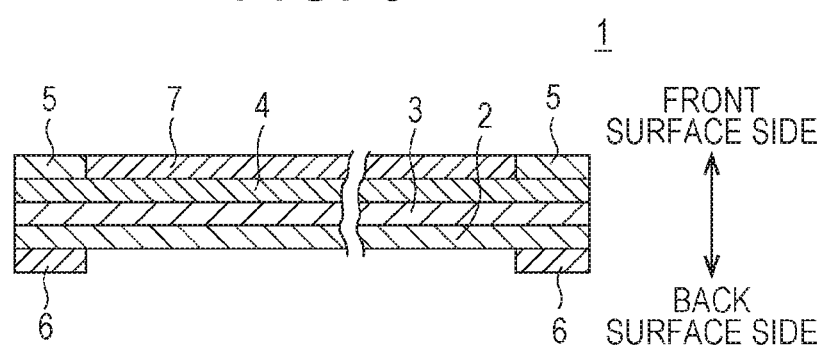
FIG. 8 is a schematic cross-sectional view of a transparent adhesive sheet according to a variation of the third embodiment.

In the third embodiment, the release layer 5 is formed on the protective layer 7. However, as illustrated in FIG. 8, the release layer 5 may be formed so as to be in contact with the intermediate layer 4, while the protective layer 7 may be omitted in the portion where the release layer 5 is formed. Such a structure can save the material and the like necessary for the formation of the protective layer 7. Also, when the release layer 5 has a function equivalent to that of the protective layer 7, a problem does not particularly arise even if the protective layer 7 does not exist in the portion where the release layer 5 is formed.

In the third embodiment, the release layer 5 is formed in a part of the outermost front surface side corresponding to the portion of where the adhesive layer 6 is formed. However, the release layer 5 may be formed on the whole of the outermost front surface side. Such a structure can prevent a difference in gloss from being generated between the portion where the release layer 5 is formed and the portion where the release layer 5 is not formed. Furthermore, the formation of the release layer 5 on the whole surface may facilitate manufacture in some cases.

In each of the above-described embodiments, layers other than the base material layer 2, the adhesive layer 6, the recording layer 3, and the release layer 5 are not essential. Such layers may be optionally combined depending on applications. For example, when sufficient transparency can be obtained while the protection of the recording layer 3 is sufficient for a certain application, the intermediate layer 4 may be omitted.

In each of the above-described embodiments, the transparent adhesive sheet 1 may include a layer other than the above-described layers. For example, the transparent adhesive sheet 1 may include, independently from the recording layer 3, a preprinting layer for previously printing images, letters, and the like. In this case, the preprinting layer may be formed between any of the above-described layers as necessary.

In the first and second embodiments, the transparent adhesive sheet 1 is wound around the core material 8 to be supplied. Also, in the third embodiment, the transparent adhesive sheet 1 is supplied in a shape of a large-sized sheet. However, the transparent adhesive sheet 1 may be supplied in another shape. The transparent adhesive sheet 1 may be supplied in the most suitable shape corresponding to the application, transportation, convenience in handling, and the like.

In each of the above-described embodiments, each of the layers possessed by the transparent adhesive sheet 1 does not necessarily need to be disposed on the whole surface. For example, when a portion on which printing is to be performed has been defined, the recording layer 3 may be disposed only in and near the portion. Accordingly, the material and the like necessary for the formation of the recording layer 3 can be saved and reduced. Furthermore, the intermediate layer 4 and the protective layer 7 in the portion where the recording layer 3 is not formed may be omitted.

Each of the above-described embodiments is illustrated as an example. Certainly, other embodiments are contemplated within the scope as described in the claims.

EXAMPLES

Hereinafter, the present invention will be specifically described based on examples and comparative examples. However, the present invention is not limited to the following examples.

Example 1

(1) Formation of Recording Layer 3

A coating liquid for the recording layer 3 (coating liquid A) was prepared by dispersing, in an appropriate amount of water, 12 parts by mass of 2-anilino-6-di(n-butyl)amino-3-methylfluoran (average particle diameter: 0.5 μm) as a leuco dye, 25 parts by mass of 3,3'-diallyl-4,4'-dihydroxydiphenylsulfone (average particle diameter: 0.4 μm) as a developer, 20 parts by mass of SBR (styrene butadiene rubber, Tg-3° C.) as a binding agent, 10 parts by mass of kaolin (average particle diameter: 0.4 μm) as a filler, and 4 parts by mass of paraffin (melting point: 46° C., average particle diameter: 0.2 μm) as the first diffuse reflection suppression component.

The coating liquid A was applied on the whole surface on the front surface side of an OPP film (biaxial stretched polypropylene film, thickness 40 μm) as the base material layer. The applied coating liquid A was dried to form the recording layer 3. At this time, the coating liquid A was applied such that the applied amount of the coating liquid A becomes 4.0 g/m$^2$ in terms of the weight after drying.

(2) Formation of Intermediate Layer 4

A coating liquid for the intermediate layer 4 (coating liquid B) was prepared by dispersing, in an appropriate amount of water, a core shell-type acrylic resin as the first diffuse reflection suppression component. The coating liquid B was applied on the whole surface on the front surface side of the recording layer 3 of the layered body obtained in the above-described (1). The applied coating liquid B was dried to form the intermediate layer 4. At this time, the coating liquid B was applied such that the applied amount of the coating liquid B becomes 1.8 g/m² in terms of the weight after drying.

(3) Formation of Protective Layer 7

A coating liquid for the protective layer 7 (coating liquid C) was prepared by dispersing, in an appropriate amount of water, 15 parts by mass of colloidal silica having a particle diameter of several nm, 30 parts by mass of colloidal silica having a particle diameter of several tens nm, 10 parts by mass of PE particles (average particle diameter: 0.12 μm), 5 parts by mass of zinc stearate (average particle diameter: 5.5 μm), a binding agent (50 parts by mass of acrylic resin (polyacrylic acid), and 5 parts by mass of ammonium zirconium carbonate as a crosslinking agent).

The coating liquid C was applied on the whole surface on the front surface side of the intermediate layer 4 of the layered body obtained in the above-described (2). The applied coating liquid C was dried to form the protective layer 7. At this time, the coating liquid C was applied such that the applied amount of the coating liquid C becomes 1.5 g/m² in terms of the weight after drying.

(4) Formation of Release Layer 5

The release layer 5 was formed by applying a silicone-based release agent (silicone resin) on the whole surface on the front surface side of the protective layer 7 of the layered body obtained in the above-described (3), such that the applied amount thereof becomes 0.5 g/m².

(5) Formation of Adhesive Layer 6

The adhesive layer 6 was formed by applying an acrylic-based adhesive agent on the whole surface on the back surface side of the base material layer of the layered body obtained in the above-described (4), such that the applied amount thereof becomes 10 g/m². In this manner, a transparent adhesive sheet having a shape of an adhesive tape was prepared.

(6) Evaluation (a) Opacity

The obtained transparent adhesive sheet was measured for opacity in accordance with JIS P8138 using a reflectometer (manufactured by Tokyo Denshoku. co., Ltd., TC-6DS/A type reflectometer). As a result, the opacity was 7.4%.

(b) Visibility

A sensory test on whether an object can be visually recognized through a transparent adhesive sheet was performed in the following procedure.

A transparent adhesive sheet was placed at a distance of 1.5 cm from cooked rice as an object. The cooked rice was visually observed through the transparent adhesive sheet from the release layer 5 side, and it was evaluated whether grains of the cooked rice can be recognized or not. The evaluation was performed with five test subjects. As a result, all of the five test subjects were able to recognize the grains of the cooked rice.

Examples 2 to 4 and Comparative Example 1

Transparent adhesive sheets each having the opacity indicated in Table 1 were prepared in the same method as Example 1, except that the thickness of the base material layer was adjusted, and the applied amount of each layer was adjusted.

It is noted that the transparent adhesive sheets of Examples 1 to 4 obtained as described above were transparent in the state before the recording layer 3 develops color. However, the transparent adhesive sheet of Comparative Example 1 was opaque in the state before the recording layer 3 develops color.

The results of the examples and comparative example are illustrated in Table 1. It is noted that visibility was evaluated by the number of persons who were able to visually recognize an object, among five test subjects.

TABLE 1

|  | Opacity [%] | Visibility |
|---|---|---|
| Example 1 | 7.4 | 5/5 |
| Example 2 | 13.3 | 5/5 |
| Example 3 | 19.6 | 5/5 |
| Example 4 | 24.7 | 4/5 |
| Comparative Example 1 | 29.8 | 0/5 |

The transparent adhesive sheets of Examples 1 to 4 had high transparency. Therefore, four or five out of five test subjects were able to visually recognize an object through the transparent adhesive sheet in the sensory test of visibility. The transparent adhesive sheet of Comparative Example 1 was also opaque by visual inspection. As a result, five out of five test subjects were not able to recognize an object through the transparent adhesive sheet.

Examples 5 to 7

A transparent adhesive sheet was prepared by forming the intermediate layer 4 in the same method as Example 1, except that acrylic resin (Example 5), PVA (Example 6), or SBR (Example 7) was used in place of the core shell-type acrylic resin in (2) Formation of intermediate layer 4. The obtained transparent adhesive sheet was evaluated in the same method as Example 1.

As a result, in all of Examples 5 to 7, the opacity of the transparent adhesive sheet was not more than 10%. These adhesive sheets were excellent in transparency. In these Examples, high visibility, which was the same as Example 1, was exhibited.

The transparent adhesive sheets obtained in Examples 1 and 5 to 7 were evaluated for water resistance and oil resistance in the following procedure.

(a) Water Resistance

A transparent adhesive sheet was immersed in tap water at 23° C. for 24 hours. Thereafter, the transparent adhesive sheet was removed from water, and it was confirmed whether or not the surface layer had fallen off due to a blister or the like (peeling of the surface).

(b) Oil Resistance

Printing was performed on the recording layer 3 of a transparent adhesive sheet by a thermal transfer printer. Two drops of food oil were dropped on the surface of the transparent adhesive sheet where printing was performed, and allowed to stand at 40° C. for 15 hours. Thereafter, the state of the type was checked.

As a result, when PVA was used in the intermediate layer 4, peeling was caused on the surface in the water resistance evaluation. When acrylic resin or SBR was used in the intermediate layer 4, a portion where the type disappeared was caused in the oil resistance evaluation. Therefore, from the viewpoint of water resistance and oil resistance, the core shell-type particle is preferably used in the intermediate layer 4.

DESCRIPTION OF REFERENCE SIGNS 1 transparent adhesive sheet
1a wound body
2 base material layer
3 recording layer
4 intermediate layer
5 release layer
6 adhesive layer
7 protective layer
8 core material
9 cassette
10a thermal head
10b drive roller
20 container
20a lid body
20b container body

The invention claimed is:

1. A transparent adhesive sheet comprising:
a base material layer formed with a transparent material;
an adhesive layer formed on a back surface side of the base material layer and formed with an adhesive agent for bonding to an adherend;
a recording layer formed on a front surface side of the base material layer and including a color developing material that thermally develops color; and
a release layer formed on the further front surface side of the recording layer and having release properties to the adhesive agent, wherein
the transparent adhesive sheet is transparent in a state before the recording layer develops color,
the transparent adhesive sheet further comprises:
an intermediate layer that is disposed on the front surface side of the recording layer to be in contact with the recording layer, the intermediate layer including a second diffuse reflection suppression component for suppressing diffuse reflection in the transparent adhesive sheet, the second diffuse reflection suppression component containing hydrophilic resins or water-soluble resins; and
a protective layer that is disposed on the front surface side of the intermediate layer, the protecting layer protecting the intermediate layer and the recording layer, the protective layer including a binding agent and a filler.

2. The transparent adhesive sheet according to claim 1, wherein
the transparent adhesive sheet has opacity in accordance with JIS P8138 of not more than 25% in a state before the recording layer develops color.

3. The transparent adhesive sheet according to claim 2, wherein
the recording layer includes a first diffuse reflection suppression component for suppressing diffuse reflection in the transparent adhesive sheet.

4. The transparent adhesive sheet according to claim 3, wherein
the first diffuse reflection suppression component includes an organic material having a melting point lower than a color developing temperature of the color developing material.

5. The transparent adhesive sheet according to claim 4, wherein the organic material contains paraffin.

6. The transparent adhesive sheet according to claim 1, wherein
the recording layer includes a first diffuse reflection suppression component for suppressing diffuse reflection in the transparent adhesive sheet.

7. The transparent adhesive sheet according to claim 6, wherein
the first diffuse reflection suppression component includes an organic material having a melting point lower than a color developing temperature of the color developing material.

8. The transparent adhesive sheet according to claim 7, wherein the organic material contains paraffin.

9. The transparent adhesive sheet according to claim 6, wherein
the transparent adhesive sheet is wound around a circumferential surface of a tubular or columnar core material.

10. The transparent adhesive sheet according to claim 1, wherein
the second diffuse reflection suppression component is core shell-type particles each containing the hydrophilic resins or the water-soluble resins in a shell.

11. The transparent adhesive sheet according to claim 1, wherein
the transparent adhesive sheet is wound around a circumferential surface of a tubular or columnar core material.

12. The transparent adhesive sheet according to claim 1, wherein the binding agent of the protective layer comprises a first group and a second group of colloidal silica particles, the first group of colloidal silica particles having an average particle diameter of not less than 1 nm and less than 20 nm and the second group of colloidal silica particles having an average particle diameter of 20 to 500 nm.

13. A transparent adhesive sheet comprising:
a base material layer comprising a transparent material;
an adhesive layer comprising an adhesive agent for bonding to an adherend, the adhesive layer being disposed on a surface of the base material layer at a back surface side of the base material layer;
a recording layer comprising a color developing material that thermally develops color, the recording layer being disposed on a surface of the base material layer at a front surface side of the base material layer;
an intermediate layer having a front surface at the front surface side and a back surface at the back surface side, the back surface of the intermediate layer being in direct contact with a surface of the recording layer at the front surface side;
a protective layer having a front surface at the front surface side and a back surface at the back surface side, the back surface of the protective layer being in direct contact with the front surface of the intermediate layer, the protecting layer protecting the intermediate layer and the recording layer; and
a release layer disposed on the front surface of the protective layer and having release properties to the adhesive agent, wherein
the transparent adhesive sheet is transparent in a state before the recording layer develops color,
the intermediate layer includes a second diffuse reflection suppression component for suppressing diffuse reflection in the transparent adhesive sheet, the second diffuse reflection suppression component comprising hydrophilic resins or water-soluble resins, and
the protective layer includes a binding agent and a filler, the binding agent comprising a first group and a second group of colloidal silica particles, the first group of colloidal silica particles having an average particle diameter of not less than 1 nm and less than 20 nm and the second group of colloidal silica particles colloidal silica having an average particle diameter of 20 to 500 nm.

* * * * *